April 13, 1948.   H. B. LOEWER   2,439,478
FRICTION SHOCK ABSORBER
Filed Oct. 8, 1945   2 Sheets-Sheet 1

Inventor:
Henry B. Loewer.
By Henry Fuchs.
Atty.

April 13, 1948. H. B. LOEWER 2,439,478
FRICTION SHOCK ABSORBER
Filed Oct. 8, 1945 2 Sheets-Sheet 2
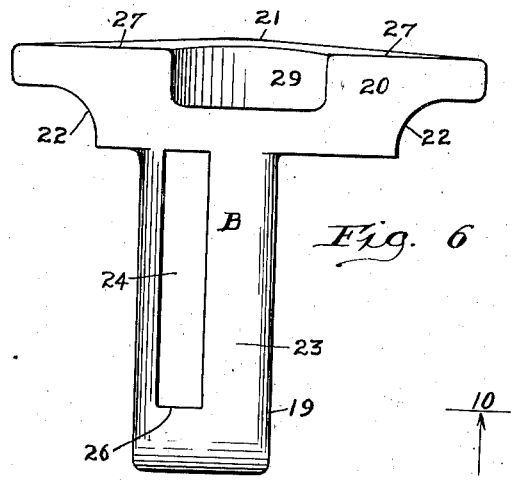
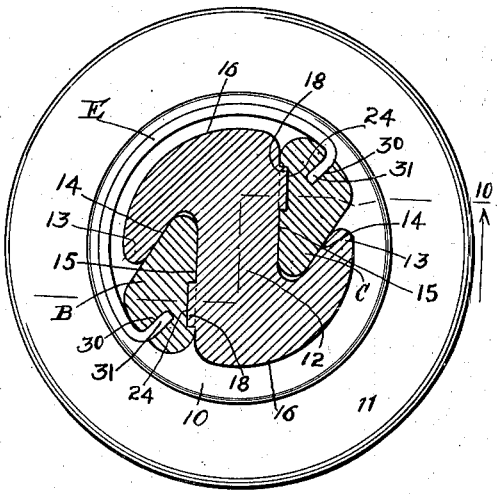
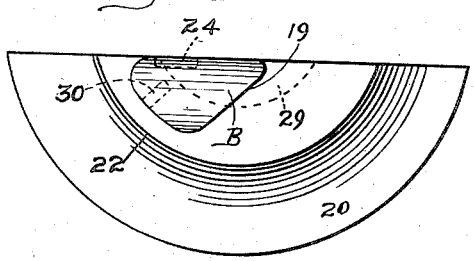
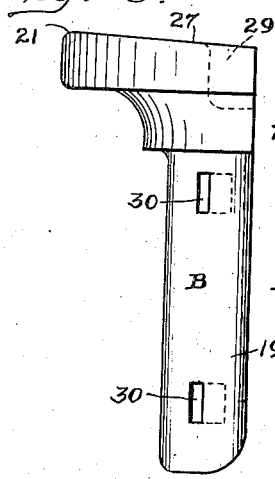
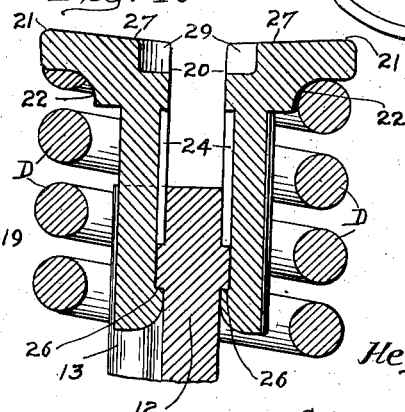
Inventor:
Henry B. Loewer.
By Henry Fuchs.
Atty.

Patented Apr. 13, 1948

2,439,478

UNITED STATES PATENT OFFICE 2,439,478

FRICTION SHOCK ABSORBER

Henry B. Loewer, Kenmore, N. Y., assignor to W. H. Miner, Inc., Chicago, Ill., a corporation of Delaware Application October 8, 1945, Serial No. 621,132

8 Claims. (Cl. 267—9)

This invention relates to improvements in friction shock absorbers, especially designed for snubbing or dampening the action of springs of railway car trucks.

One object of the invention is to provide a friction shock absorber adapted to replace one or more of the spring units of a truck spring cluster of a railway car for snubbing the action of the truck springs, comprising a friction post and cooperating friction shoes slidable on the post, wherein the shoes are tiltable toward the post, and spring means is provided for opposing relative movement of the shoes and post, and wherein the pressure exerted by the spring tends to tilt the shoes to hold the same in tight frictional contact with the post.

A further object of the invention is to provide a shock absorber as set forth in the preceding paragraph, wherein cooperating guide means is provided on the shoes and post to prevent relative turning of the shoes with respect to the post.

A further object of the invention is to provide simple and efficient means in a shock absorber of the character described for holding the shoes and post assembled.

A still further object of the invention is to provide in a shock absorber comprising relatively slidable friction elements, means for positively limiting lengthwise separation of the post and shoes.

Other objects of the invention will more clearly appear from the description and claims hereinafter following.

Figure 1:
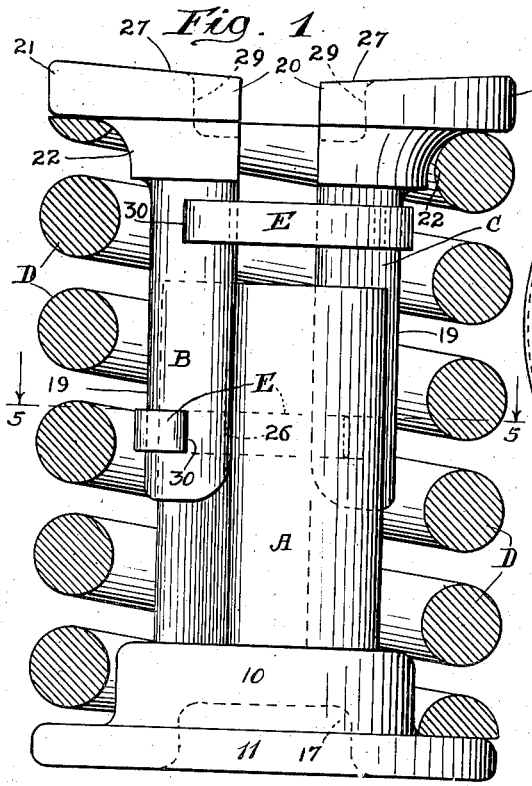
Figure 2:
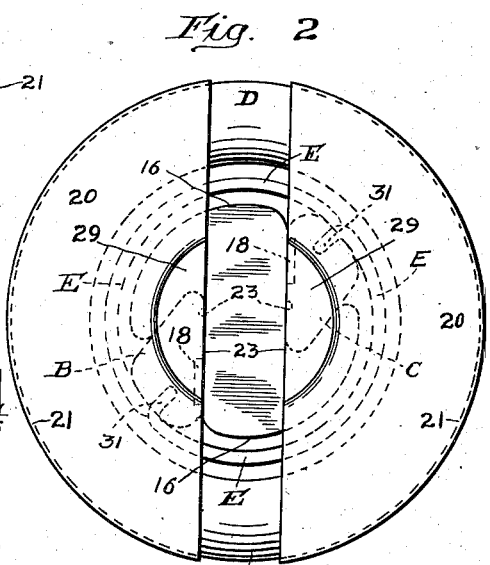
Figure 3:
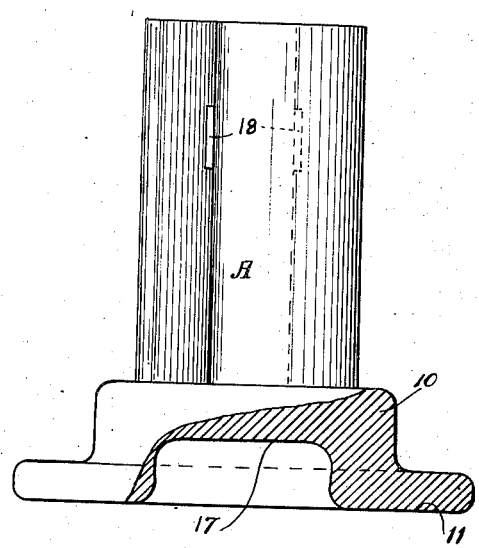
Figure 4:
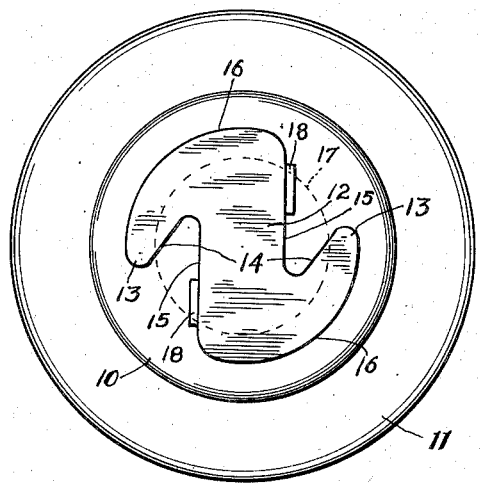

In the drawings forming a part of this specification, Figure 1 is an elevational view of my improved shock absorber showing the spring which surrounds the parts, in vertical section. Figure 2 is a top plan view of Figure 1. Figure 3 is a front elevational view of the post of my improved shock absorber, as shown in Figure 1, the base of the post being shown partly in section. Figure 4 is a top plan view of Figure 3. Figure 5 is a horizontal sectional view, corresponding substantially to the line 5—5 of Figure 1. Figure 6 is a side elevational view of the left hand shoe illustrated in Figure 1, looking from left to right in said figure. Figure 7 is a top plan view of Figure 6. Figure 8 is a front elevational view of the left hand shoe shown in Figure 1. Figure 9 is a plan view of one of the spring clips for holding the shoes assembled with the post. Figure 10 is a transverse, vertical sectional view, corresponding substantially to the offset line 10—10 of Figure 5.

As shown in the drawings, my improved shock absorber comprises broadly a friction post A; a pair of friction shoes B and C; a spring resistance D; and a pair of retaining clips E—E.

The friction post A is provided with a base portion 10 having a laterally outstanding annular flange 11, which forms, in effect, a follower member. The post A is of broadly Z-shaped, transverse cross section, as most clearly shown in Figure 5, comprising a vertically disposed, transversely extending, central section 12 and inturned portions 13—13 at opposite sides of the section 12 in the form of flanges which extend lengthwise and overhang the central section 12. The overhanging, inturned portions 13—13 provide vertically extending guideways 14—14 of V-shaped, transverse section. The central section or portion 12 presents vertically extending, flat friction surfaces 15—15 at the opposite sides of the same. Each friction surface 15 forms one side of the corresponding V-shaped guideway 14. The opposite side faces or ends of the central portion or section 12 of the post A and the outer sides of the inturned portions 13—13 are rounded off, as clearly shown in Figures 4 and 5 to provide concentric, cylindrical surfaces 16—16 of the same radius. The post A thus is, in effect, of cylindrical cross section with guideways cut into opposite sides thereof. The base 10 of the post A is provided with the usual recess or seat 17 adapted to accommodate the spring centering projection of the bottom spring plate of a truck spring cluster. The portion or section 12 of the post is provided with a pair of stop lugs 18—18 at opposite sides thereof which project from the friction surfaces and are spaced inwardly from the upper end of the post. As clearly shown in Figure 10, the lugs 18—18 are in transverse, horizontal alignment.

The two friction shoes B and C are of similar design and are arranged within the pockets or guideways 14—14 at opposite sides of the post A. Each shoe comprises a barlike member 19 of broadly triangular, transverse cross section having an enlargement or head 20 at the upper end thereof. The heads 20 of the two shoes B and C together form an upper follower member. The head 20 of each shoe is provided with an arc-shaped, peripheral flange 21 and the outer surface of the head beneath the flange 21 is concavely rounded to form a seat 22 for the inner side of the upper end coil of the spring resistance D, which, as shown, is in the form of a helical coil made from a bar of cylindrical, transverse cross section. Each shoe is provided with a vertically extending, substantially flat, friction surface 23 on the inner side thereof engaging the corresponding friction surface 15 of the post A. On the inner side or friction surface portion thereof, each shoe has a vertically extending slot 24 adapted to accommodate the corresponding stop lug 18 of the post A. The lower end wall of the slot 24, which wall is indicated by 26, provides a stop shoulder adapted to engage the lug 18 to limit upward movement of the shoe with respect to the post. As most clearly shown in Figure 1, the upper end faces of the heads 20—20 of the shoes B and C are inclined upwardly in a direction outwardly from the central, transverse plane between said posts, as indicated at 27, thus providing fulcrum portions at the outer sides of the heads of the shoes. The two shoes thus have rocking or tilting engagement with the upper spring plate of the spring cluster to be rocked toward the post A by the pressure of the spring resistance D. The shoes B and C are further provided with a recess or pocket 29 which opens upwardly and receives the centering lug of the upper spring plate of the spring cluster, said pocket being formed partly in each shoe. On the outer side thereof, each shoe has a pair of vertically aligned seats or pockets 30—30, adjacent the upper and lower ends, for anchoring the spring clips E—E, as hereinafter pointed out.

The spring D is in the form of a heavy helical coil and surrounds the post A and the shoes B and C, having its top and bottom ends bearing on the flanges 21—21 of the heads of the shoes B and C and the flange 11 of the post A. In the assembled condition of the mechanism, the spring resistance D is preferably under slight initial compression.

The two spring clips E—E are of similar design, each being in the form of a bowed plate or strip of rectangular cross section, having inturned hook portions 31—31 at opposite ends thereof. These clips E—E connect the shoes and have the bowed portions thereof spanning the space between the shoes and spaced outwardly away from the post A, as most clearly shown in Figure 5. The spring clips or plates E—E are disposed respectively at the upper and lower ends of the shoes with the hooked ends 31—31 thereof engaged in the corresponding seats of the two shoes respectively, the upper clip being disposed at one side of the mechanism and the lower clip at the opposite side thereof. The upper clip thus ties together the shoes at one side of the mechanism at the upper ends of the shoes and the lower clip thus ties the same together at the opposite side of the mechanism at the lower ends of said shoes.

My improved shock absorber when used to snub the action of truck springs of railway cars is substituted for one of the spring units of the truck spring cluster and is interposed between the top and bottom spring plates of said cluster with the centering projections of the spring plates engaged within the seats 17 and 29 of the post and shoes.

The operation of my improved shock absorber is as follows: Upon relative lengthwise movement of the shoes and post toward each other, due to compression of the shock absorber between two relatively movable members, such as the top and bottom spring plates of the truck spring cluster of a car, the spring D is compressed and exerts pressure on the shoes, tending to tilt the same toward the post, bringing the friction surfaces thereof into tight frictional contact with each other, the shoes rocking or tilting on the upper spring plate of the spring cluster. High frictional resistance to snub the action of the truck springs is thus produced by the sliding frictional engagement of the shoes with the friction surfaces of the post. At all times during the operation of the shock absorber, the shoes are effectively held against turning about the post, being guided for lengthwise movement in the V-shaped guideways 14—14 at opposite sides of said post. Upon recoil of the truck springs, the spring D returns the parts to the normal position shown in Figure 1, upward movement of the shoes being limited by engagement of the shoulders 26—26 thereof with the lugs 18—18 of the post A.

Although my improved shock absorber has been herein specifically described as applied to railway car trucks, it will be evident to those skilled in this art that the same may be employed equally well in connection with railway draft riggings to absorb the usual buffing and draft shocks, and many other devices.

I claim:

1. In a friction shock absorber, the combination with a friction post having longitudinally extending, flat friction surfaces at opposite sides thereof; of longitudinally extending guide flanges at opposite sides of said post, each guide flange overhanging the corresponding friction surface and having an inner, laterally extending surface disposed at an acute angle to the corresponding friction surface and forming with the latter a guideway of V-shaped, transverse section; and a pair of lengthwise movable friction shoes at opposite sides of said post, each shoe being of triangular, transverse section and slidably fitting the V-shaped guideway at the corresponding side of the post, each of said shoes having a lengthwise extending friction surface on the inner side thereof engaging the corresponding friction surface of the post.

2. In a friction shock absorber, the combination with a friction post having lengthwise extending friction surfaces at opposite sides thereof; of a pair of friction shoes, each shoe having lengthwise sliding engagement with one of the friction surfaces of the post; and a spring clip extending around one side of the post and anchored at opposite ends to said shoes respectively for holding the shoes assembled with the post.

3. In a friction shock absorber, the combination with a friction post having lengthwise extending friction surfaces at opposite sides thereof; of a pair of friction shoes, each shoe having lengthwise sliding engagement with one of said friction surfaces of the post; and an elongated bowed spring clip extending around one side of the post and anchored at opposite ends to said shoes respectively for holding the shoes assembled with the post.

4. In a friction shock absorber, the combination with a friction post having lengthwise extending friction surfaces at opposite sides thereof; of a pair of friction shoes, each shoe having lengthwise sliding engagement with one of said friction surfaces of the post; and a pair of bowed spring clips for holding the shoes assembled with the post, one of said spring clips extending from one of the shoes to the other at one side of the post and having its opposite ends anchored to said shoes respectively and the other of said clips extending from one shoe to the other at the opposite side of the post and having its opposite ends anchored to said shoes respectively.

5. In a friction shock absorber, the combination with a friction post having lengthwise extending friction surfaces at opposite sides thereof; of a longitudinally extending guide flange on said post at each side thereof extending transversely at an angle to the friction surface at the corresponding side of the post; a pair of friction shoes at opposite sides of the post, said shoes being lengthwise slidable with respect to the post, each shoe being embraced between the flange and the friction surface at the corresponding side of the post and having a friction surface engaging said friction surface of the post; and a pair of bowed spring clips for holding the shoes assembled with the post, one of said spring clips extending from one shoe to the other at one side of the post and having the opposite ends thereof anchored to said shoes respectively, and the other of said clips extending from one shoe to the other at the opposite side of the post and having its opposite ends anchored to said shoes respectively.

6. In a friction shock absorber, the combination with a friction post having a follower member at the outer end thereof; of a pair of friction shoes having lengthwise sliding engagement with the post, said shoes having follower flanges at the outer ends thereof, said flanges being fulcrumed at opposite sides of the mechanism to support said shoes for tilting movement toward the post; a pair of spring clips at opposite sides of said post, each of said spring clips being anchored to said shoes at opposite ends for holding the shoes assembled with the post; and a spring surrounding said post and shoes and bearing at opposite ends on the follower flanges of said shoes and follower member of said post.

7. In a friction shock absorber, the combination with a friction post having a follower member at the outer end thereof, said post having lengthwise extending friction surfaces at opposite sides thereof, and a lengthwise extending guide wall laterally overhanging each friction surface; of a pair of friction shoes having lengthwise sliding engagement with the friction surfaces of the post, each shoe being embraced between one of said guide walls and the corresponding friction surface, said shoes having follower flanges at their outer ends, said flanges being fulcrumed at opposite sides of the mechanism to mount said shoes for tilting movement toward said post; and a spring surrounding said post and shoes and bearing at opposite ends on the follower flanges of said shoes and the follower member of said post.

8. In a friction shock absorber, the combination with a friction post having a follower member at the outer end thereof, said post having lengthwise extending friction surfaces at opposite sides thereof, and a lengthwise extending guide wall laterally overhanging each friction surface; of a pair of friction shoes having lengthwise sliding engagement with the friction surfaces of the post, each shoe being embraced between one of said guide walls and the corresponding friction surface, said shoes having follower flanges at their outer ends, said flanges being fulcrumed at opposite sides of the mechanism to mount said shoes for tilting movement toward said post; a pair of spring clips at opposite sides of said post, each of said clips being anchored to said shoes at opposite ends for holding the shoes assembled with the post; and a spring surrounding said post and shoes and bearing at opposite ends on the follower flanges of said shoes and the follower member of said post.

HENRY B. LOEWER.

REFERENCES CITED

The following references are of record in the file of this patent:

UNITED STATES PATENTS

| Number | Name | Date |
|---|---|---|
| 488,474 | Gibbs | Dec. 20, 1892 |
| 1,442,893 | Lewis | Jan. 23, 1923 |
| 1,644,391 | Mitchell | Oct. 4, 1927 |
| 1,938,715 | Miner | Dec. 12, 1933 |
| 2,073,761 | Shafer | Mar. 16, 1937 |
| 2,396,774 | Dath | Mar. 19, 1946 |